Nov. 25, 1952 T. J. VIVIANO 2,619,049
DIE FOR FORMING MACARONI DOUGH INTO ANIMAL SHAPE
Filed April 4, 1951
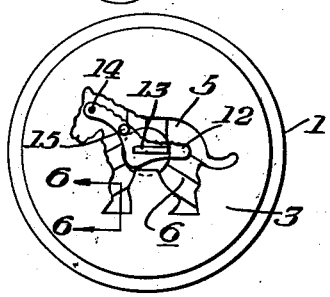
INVENTOR.
Thomas J. Viviano.
BY Jack R Snyder
ATTORNEY.

Patented Nov. 25, 1952

2,619,049

UNITED STATES PATENT OFFICE 2,619,049

DIE FOR FORMING MACARONI DOUGH
INTO ANIMAL SHAPE

Thomas J. Viviano, Greentree, Pa., assignor to
Zoo-Mac, Inc., St. Louis, Mo., a corporation of
Missouri Application April 4, 1951, Serial No. 219,228

3 Claims. (Cl. 107—14)

This invention relates to a forming die for shaping macaroni dough into miniature animal form, and important objects and advantages thereof are to provide a die of the character described, which will function efficiently to uniformly advance the macaroni dough through the embodied animal design opening in the die in a manner to prevent the bulging of the dough at the larger areas of said opening when the dough is being forced through the latter in forming the animal contour and thus assure the production of a figurative macaroni product of uniform thickness and density, and which embodies novel means for preventing the distortion of the product during and by the cooking process and for generally assuring uniform thickness throughout the area of the product after the cooking operation.

Further objects of the invention are to provide a device of the class stated, which is simple in its construction and arrangement, compact, durable and efficient in its use, and comparatively economical in its manufacture and operation.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a forward end view of a forming die constructed in accordance with the invention.

Figure 2 is a rearward end view thereof.

Figure 3 is a side view of the device.

Figure 4 is a forward end view of the dough directing element. Figure 5 is a side view of said element. Figure 6 is a sectional view on line 6—6, Figure 1, and Figure 7 is a plan view of the product formed by the improved die.

Referring in detail to the drawing, the forming die comprises a cylindrical casing 1 providing a cylindrical chamber 2. The casing has a forward end wall 3, and is open at its rearward end. The rearward end portion of the chamber is enlarged to form an annular shoulder 4 intermediate of the ends of the chamber. The end wall 3 is provided with a centrally disposed figurative opening 5 outlining the design or form of an animal.

A dough directing element 6 is removably mounted in the chamber 2, and includes three pairs of radially disposed supporting arms 7. The arms of each pair are arranged in spaced super-imposed relation and have their outer ends joined by a slide 18, which slidably engages the wall of the enlarged portion of the chamber 2. The forward ends of the slides 18 seat on the shoulder 4 to limit the forward movement of the directing element in the chamber. One of the slides 18 is formed with a ridge 8, which engages in a groove 9 formed in the wall of the enlarged portion of the chamber to prevent the rotation of the directing element in the casing chamber. The rearward faces of the supporting arms taper rearwardly to substantially V-shape in transverse section, for the purpose to be described.

A cylindrical stem 10, including an enlarged forward portion 11, is fixed to the joined inner ends of the forwardly disposed supporting arms 7, and projects forwardly in the casing chamber 2 at the diametric center of the latter. A transversely disposed dough directing member 12 is fixed to the forward end of the enlarged portion 11, and is spaced from the casing end wall 3 when the directing element 6 is mounted in the casing chamber 2, as shown in Figure 3.

The directing member 12 is positioned rearwardly and centrally of the large areas of the animal design opening 5, namely the body, neck, and head areas of the latter. The directing member is shaped generally on a reduced scale to conform to some extent to the contour of the outlines of said large opening areas, and the width thereof is somewhat less than the diameter of the enlarged forward portion 11 of the stem 10, as illustrated in Figure 4.

The directing member 12 carries three fixed, forwardly extending projections, respectively indicated at 13, 14, and 15. The projection 13 is comparatively large, and is flat, oblong, rectangularly-shaped, and is disposed in longitudinal alignment with the stem 10. The projection 13 extends into the animal design opening 5 at approximately the center of the animal body area of the latter, and the free end thereof is disposed flush with the outer or forward face of the casing end wall 3.

The projection 14 is round and disposed adjacent to one end of the directing member 12 and extends into the animal design opening 5 at the animal head area of the latter, and the free end thereof is likewise disposed flush with the outer face of the casing end wall 3.

The projection 15 is round and relatively short, and is of a diameter considerably greater than the diameter of the projection 14. The projection 15 is directed toward the animal neck area of the design opening 5, and the free end thereof is disposed a considerable distance from the interior face of the end wall 3.

A recess 16 is formed in the inner face of the casing end wall 3 at each of the feet of the animal design opening 5, and a recess 17 is formed at the terminus of the tail of the design opening in like manner, as shown in Figure 2. The purpose of the recesses 16 and 17 is to lessen the retardation of movement of the dough through these lesser opening areas during the forming operation to be described.

In practice the operation of the improved forming die is as follows: The directing element 6 being mounted in the chamber 2 of the casing 1, the macaroni dough, of the proper consistency, is forced into the casing chamber through the rearward open end of the latter. As the dough enters the chamber 2 it will be separated into three streams by the tapered supporting legs 7, and will remerge at the directing member 12 around the stem 10. The dough will then advance around the directing member, and around the projections 13, 14 and 15, and will finally issue through the animal design opening 5 in the casing end wall 3 shaped in the animal contour. As the formed dough issues from the design opening 5, it is cut, by any suitable cutting mechanism, to provide the thickness desired for the macaroni product 19, as shown in Figure 7.

As the free end of the flat projection 13 is flush with the outer face of the casing end wall 3, the body area of the animal design product 19, when cut to thickness, will be formed with a fairly large hole 20. In like manner, the projection 14 will form a relatively small hole 21 in the head area of the product to represent the eye of the animal formation. The forming of the larger hole 20 in the product 19 is an important feature of the invention, as it provides necessary clearance for allowing the expansion of the product in a manner assuring the uniform thickness of the product throughout its area during and after the cooking operation.

The enlarged stem portion 11, the directing member 12, and the projections 13, 14 and 15, and the recesses 16 and 17, all function in combination to equalize the distribution of the dough to cause the latter to pass from the opening 5 in uniform density and flatness, without bulging at the larger areas of said design opening.

The present invention provides a most efficient device of its kind which may be economically constructed and successfully employed for the purpose and in the manner herein set forth.

What I claim is:

1. A dough forming die of the class described, comprising a cylindrical casing including a forward end wall and providing a cylindrical chamber having an open rearward end, said end wall formed with a design opening outlining an animal, a dough directing element mounted in said chamber and including a dough directing member disposed adjacent to but spaced from said opening, and a pair of projections carried by said member and extending into said opening.

2. A dough forming die of the class described, comprising a cylindrical casing including a forward end wall and providing a cylindrical chamber having an open rearward end, said end wall formed with a design opening outlining an animal, a dough directing element removably mounted in said chamber and including a dough directing member disposed adjacent to but spaced from said opening, a pair of projections carried by said member and extending into said opening, and a projection carried by said member and having its free end disposed adjacent to said opening.

3. A dough forming die of the class described, comprising in combination, a cylindrical casing including a forward end wall and providing a cylindrical chamber having an open forward end, the wall of said chamber being formed with an annular shoulder, said end wall formed with a design opening outlining the contour of an animal, a dough directing element removably mounted in said chamber and including a plurality of pairs of radially disposed supporting arms, the outer ends of each of said pair of arms being joined together by a slide engaging said shoulder for limiting the forward movement of said element in said chamber, said element also including a dough directing member disposed adjacent to but spaced from said opening, a pair of projections carried by said member and extending into said opening, a projection carried by said member and being disposed between said pair of projections and having its free end spaced from said opening, and interengaging means carried by said casing and by said element for preventing the rotation of the latter in said casing.

THOMAS J. VIVIANO.

REFERENCES CITED

The following references are of record in the file of this patent:

UNITED STATES PATENTS

| Number | Name | Date |
|---|---|---|
| 1,381,592 | Laskey | Oct. 15, 1918 |
| 2,178,431 | Orr | Oct. 31, 1939 |
| 2,188,799 | Von Hasse | Jan. 30, 1940 |